(12) United States Patent
Wirrick et al.

(10) Patent No.: US 7,452,493 B2
(45) Date of Patent: Nov. 18, 2008

(54) PROTECTIVE COVER AND TOOL SPLASH FOR VEHICLE COMPONENTS

(75) Inventors: Jeffrey T. Wirrick, Bothell, WA (US); Michael J. Cloud, Snohomish, WA (US)

(73) Assignee: The Boeing Company, Chicago, IL (US)

(*) Notice: Subject to any disclaimer, the term of this patent is extended or adjusted under 35 U.S.C. 154(b) by 398 days.

(21) Appl. No.: 10/907,786

(22) Filed: Apr. 15, 2005

(65) Prior Publication Data

US 2006/0234010 A1 Oct. 19, 2006

(51) Int. Cl.
*B32B 37/00* (2006.01)
*B29C 33/40* (2006.01)
*B65D 65/02* (2006.01)

(52) U.S. Cl. .................. 264/139; 264/219; 264/220; 264/138; 264/241; 264/257; 264/259; 264/264; 264/320; 156/247; 156/288; 156/289; 156/313; 150/154

(58) Field of Classification Search .................. None
See application file for complete search history.

(56) References Cited

U.S. PATENT DOCUMENTS

| | | | | |
|---|---|---|---|---|
| 2,744,042 A | * | 5/1956 | Pace | 264/46.5 |
| 3,265,556 A | * | 8/1966 | Hungerford et al. | 428/215 |
| 4,061,812 A | * | 12/1977 | Gilwee et al. | 428/117 |
| 4,422,183 A | * | 12/1983 | Landi et al. | 2/455 |
| 4,786,350 A | * | 11/1988 | Nesbitt et al. | 156/244.24 |
| 4,988,540 A | * | 1/1991 | Bragaw et al. | 427/155 |
| 5,051,224 A | * | 9/1991 | Donatelli et al. | 264/257 |
| 5,100,732 A | * | 3/1992 | Benefiel | 428/457 |
| 5,238,725 A | * | 8/1993 | Effing et al. | 428/116 |
| 5,895,624 A | * | 4/1999 | Reece et al. | 264/554 |
| 5,976,671 A | * | 11/1999 | Gleim | 428/172 |
| 6,168,358 B1 | * | 1/2001 | Engwall et al. | 409/219 |
| 6,426,130 B2 | * | 7/2002 | Jones et al. | 428/41.8 |
| 7,052,761 B2 | * | 5/2006 | Pierson et al. | 428/172 |
| 7,078,085 B2 | * | 7/2006 | Nykamp et al. | 428/99 |
| 7,141,191 B2 | * | 11/2006 | Engwall et al. | 264/40.1 |
| 2001/0024690 A1 | * | 9/2001 | Kloock | 427/290 |
| 2002/0182957 A1 | * | 12/2002 | Levenda | 442/173 |

\* cited by examiner

*Primary Examiner*—Monica A Huson
*Assistant Examiner*—Jeffrey Wollschlager
(74) *Attorney, Agent, or Firm*—Ostrager Chong Flaherty & Broitman P.C.

(57) ABSTRACT

A method of manufacturing a protective cover (24) for a component of a vehicle includes assembling multiple layers to form a charge (22). The charge (22) is formed within a mold (50) of the component to form a multi-contoured laminate (58). The protective cover (24) is separated from the multi-contoured laminate (58). A method of forming a down stream part structure or mold (167) for a component includes assembling multiple layers to form a charge (78). The charge (78) is formed within an original mold of the component to form a multi-contoured laminate (76). A splash is separated from the multi-contoured laminate (76). A protective cover, such as the cover (24), is for a vehicle component and includes a contour holding layer (36) and a protective laminate layer (34). The contour holding layer (36) and the protective laminate layer (34) are formed within a mold of the vehicle component to form the protective cover.

13 Claims, 8 Drawing Sheets

PROTECTIVE COVER AND TOOL SPLASH FOR VEHICLE COMPONENTS

TECHNICAL FIELD

The present invention is related generally to vehicle components, to protective covers of the vehicle components, and to vehicle component tools. More particularly, the present invention is related to methods of forming protective component covers and down stream parts, structures, and molds associated with vehicle components.

BACKGROUND OF THE INVENTION

During the manufacturing and assembly of an aircraft protective covers are utilized to prevent damage to aircraft components. Repair or replacement of damaged components can be time consuming and cost abortive. The protective covers are generally wrapped over and held via straps to the components of concern. The covers guard against bumping and undesired intrusion due to shifting, transporting, storing, and assembling of components and systems during vehicle manufacturing processes. For further protection, the covers may have a flame retardant element, which reduces flammability of the covers in the event of a fire.

As an example, some aircraft components are covered with a protective wool cloth having a neoprene padding sewn therein. The wool cloth provides a durable outer layer and the neoprene padding provides an energy absorption inner layer. A flame retardant may be sprayed onto the wool cloth to prevent against enflaming of the cover.

It is understood that the use of the protective covers is costly. This is due not only to the costs related to the manufacturing and purchasing of the covers, but also to the application and removal of the covers to and from the respective components. Additional associated costs also exist in relation to the removal and reapplication of the covers for flight-testing. The covers, in general, have different characteristics, such as sizes, shapes, materials, and energy absorption traits, than their associated components. Since the characteristics are different and since the component and cover combinations perform differently and provide a different environment than the components alone, the covers are removed during testing procedures and then reapplied for continued manufacturing and assembly tasks.

It is also understood that the effectiveness of the flame retardant spray tends to diminish over time. The use of a fire retardant plastic in replacement of the flame retardant spray has been considered and is also costly.

In addition, it is also costly to form tooling or molds for vehicle components. The tools and molds can require tens-hundreds of hours to form, can be heavy, and can be difficult to handle. The tools and molds when utilized tend to become hot and the thermal energy contained therein tends to dissipate slowly. For example, upon the forming of an aircraft stowage bin door, a decorative laminate is vacuum formed onto the door to provide an esthetically pleasing and durable exterior surface. The tool used to form the decorative laminate is often referred to as a vacuum form mold. The vacuum form mold is often formed of solid blocks, which tend to be heavy. Also, during the vacuum-forming process the mold can be at such a high temperature that special equipment is needed for handling of the mold. The blocks may be of various materials including, for example, foam, aluminum, composite, and urethane.

The vacuum form molds may be formed within a fiberglass "lay-up", referred to as a "splash". The splash is formed through the lay-up of fiberglass on the mold die of the component so that it has a contour that matches that of the mold die. Typically it requires the working time of two or more technicians for approximately two days to lay-up the fiberglass. This time does not include the removing of the component mold die from service and the splitting and the cleaning of the die before use in production.

In industry it is desirable to minimize manufacturing and production costs of a vehicle and the components thereof. Thus, a need exists for an improved technique of protecting vehicle components throughout the manufacturing process of a vehicle, as well as an improved technique of forming tools for the production of vehicle components.

SUMMARY OF THE INVENTION

One embodiment of the present invention provides a method of manufacturing a protective cover for a component of a vehicle. The method includes assembling multiple layers to form a charge. The charge is formed within a mold of the component to produce a multi-contoured laminate. The protective cover is separated from the multi-contoured laminate.

Another embodiment of the present invention provides a method of forming a down stream part mold for a component that also includes the assembling of multiple layers to form a charge. The charge is formed within an original mold of the component to produce a multi-contoured laminate. A splash is separated from the multi-contoured laminate.

Yet another embodiment of the present invention provides a protective cover for and that is separate from a vehicle component. The cover includes a contour holding layer and a protective laminate layer. The contour holding layer and the protective laminate layer are formed within a mold of the vehicle component to form the protective cover.

The embodiments of the present invention provide several advantages. One such advantage is the provision of a cost effective method of forming a protective cover for a vehicle component that contains materials that are similar to that of the vehicle component. In using similar materials, the protective cover has similar fire resistant characteristics as the vehicle component, is lightweight, and as such minimizes or eliminates the need to be removed for testing procedures. Also, the protective cover provides increased durability and is resistant to undesired intrusions, such as punctures. The protective covers minimize the manufacturing time and provide improved esthetics in comparison to previous protective covers.

Another advantage provided by an embodiment of the present invention, is the provision of forming a splash from similar materials used in forming a vehicle component, and the same mold dies without disrupting production. The splash is lightweight and allows for the quick and economically effective forming of down stream part supports or molds, such as support pedestals and fixtures, for the production of down stream parts. Also, the stated technique provides a splash that has reduced thermal energy retention characteristics, thus allowing quicker and easier handling.

Other features, benefits and advantages of the present invention will become apparent from the following description of the invention, when viewed in accordance with the attached drawings and appended claims.

DETAILED DESCRIPTION

In the following Figures the same reference numerals will be used to refer to the same components. While the present invention is described primarily with respect to protective covers, splashes, and down stream parts, structures, and molds for various aircraft applications, the present invention may be applied in aeronautical applications, nautical applications, railway applications, automotive vehicle applications, and commercial and residential applications. The present invention may, for example, be applied to any part that requires matched mold dies for crushing composite parts. Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one or more constructed embodiments. These specific parameters and components are included as examples and are not meant to be limiting.

Also, in the following description the term "splash" refers to any thin rigid shell formed from a component mold die, which has similar contours as that of the mold die. A splash may be in the form of an inner mold line, an outer mold line, or a line therebetween. A splash may be formed from various materials and have any number of layers.

In addition, in the following description the term "down stream part" refers to parts formed to produce or formed from a down stream part structure or mold. A down stream part structure or mold is a secondary structure or mold that may have a contour that matches that of an original mold die of a vehicle component. An original mold die may be used to form a vehicle component, as is commonly known or to form a protective cover or splash, as is described in further detail herein. The down stream part structure or mold may be formed from a splash, be, for example, in the form of a routing fixture, a pedestal, a vacuum form mold, or an assembly jig. A routing fixture, in general, supports a part while it is trimmed. A pedestal, in general, is used to support and prevent the crushing of a part under vacuum. A vacuum form mold, in general, supports a part while a protective cover is formed over and onto the part. An assembly jig, in general, holds the parts of an assembly in the correct orientation while the assembly is adhered or fastened together. As an example, a vacuum form mold may be used to apply a decorative laminate to a vehicle component. A down stream part may be a cover, a laminate, or other down stream part known in the art.

Figure 1:
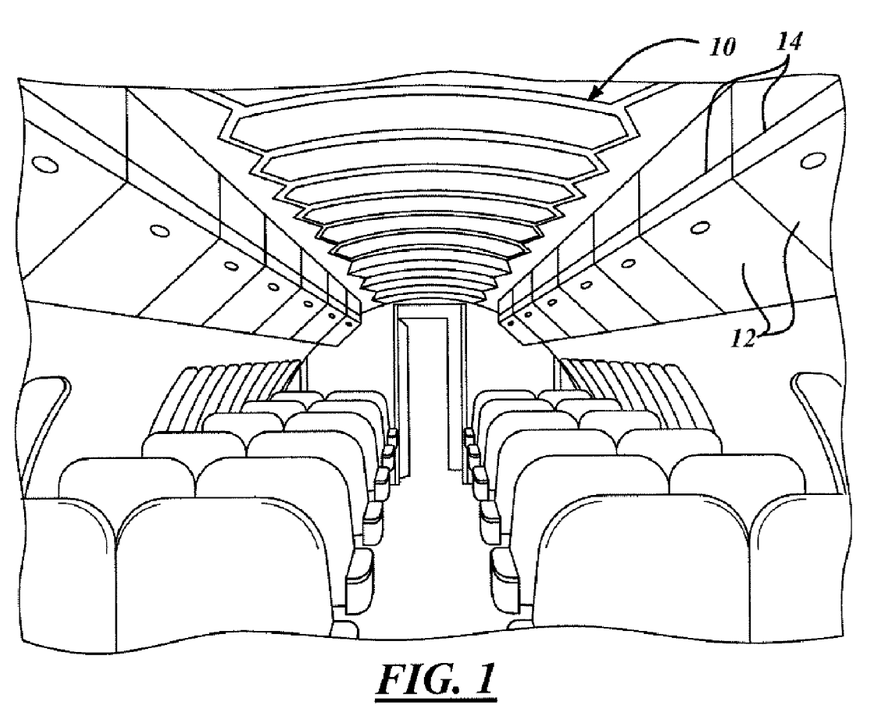
FIG. 1 is a rear pictorial view of an interior cabin of an aircraft incorporating protective covers in accordance with an embodiment of the present invention.

Referring now to FIG. 1, a rear pictorial view of an interior cabin 10 of an aircraft incorporating protective covers 12 in accordance with an embodiment of the present invention is shown. The protective covers 12 shown are utilized to protect and thus reside over the stowage bin face panels 14. The protective covers 12 are formed of similar materials and have similar aesthetic appearances as that of the bin panels 14. The protective covers 12 may be utilized throughout the manufacturing, assembly, and flight-testing of the aircraft.

Figure 2:
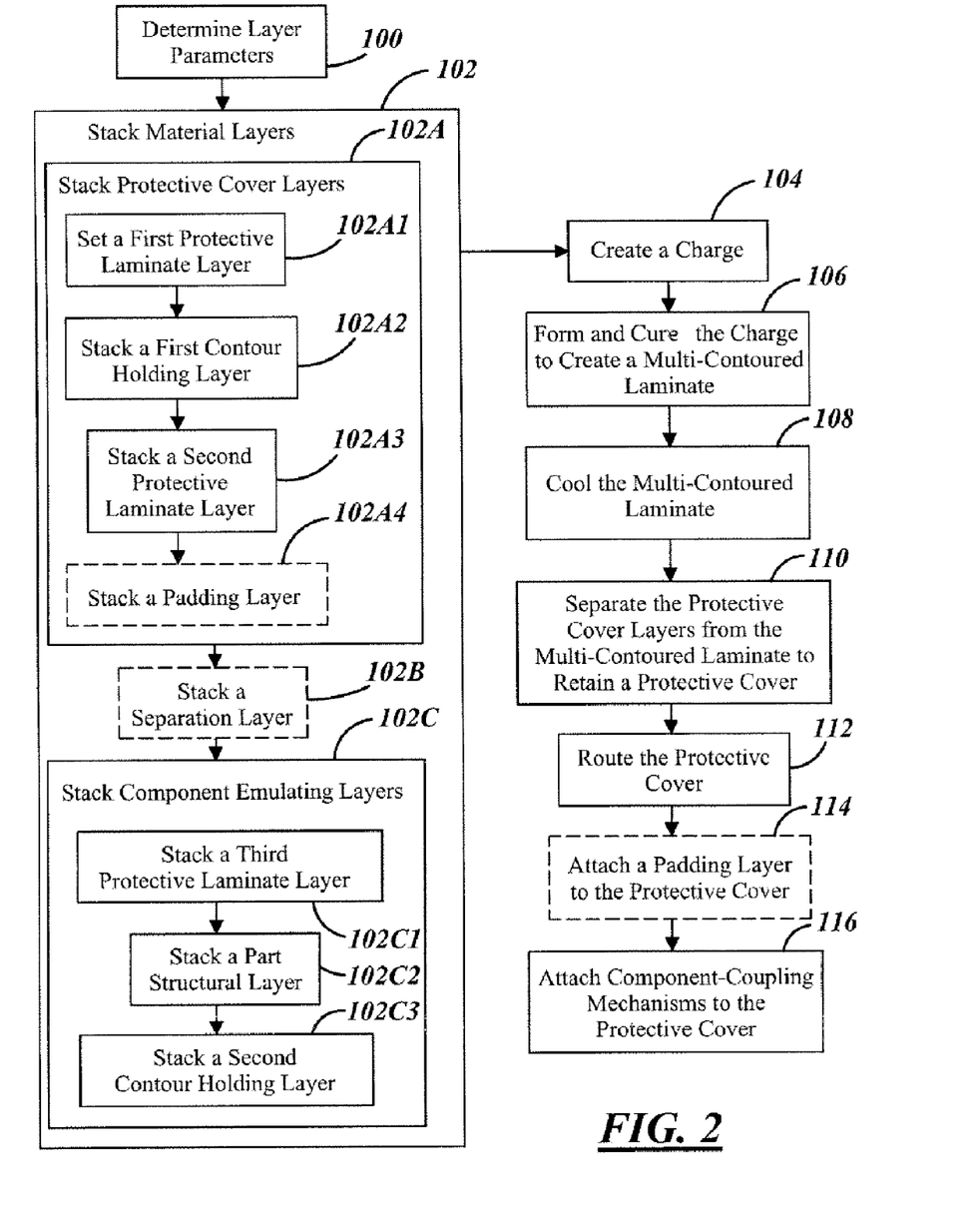
FIG. 2 is a logic flow diagram illustrating a method of manufacturing a protective cover for a component of a vehicle in accordance with an embodiment of the present invention.

Referring now to FIG. 2, a logic flow diagram illustrating a method of manufacturing a protective cover for a component of a vehicle in accordance with an embodiment of the present invention is shown. Although the following steps are primarily described with respect to a protective cover for a bin face panel of an aircraft, such as the bin panels 14, the following steps may be easily modified for other vehicle components. For example, the steps may be modified to apply to interior aircraft panels, wall units, stowage units, or other known components. Also, a specific number of layers and types of layers are shown and described, the number of each layer and the order in which the layers are stacked may be varied per application. Also, the described layers may be of various sizes and thicknesses.

Figures 3, 11:
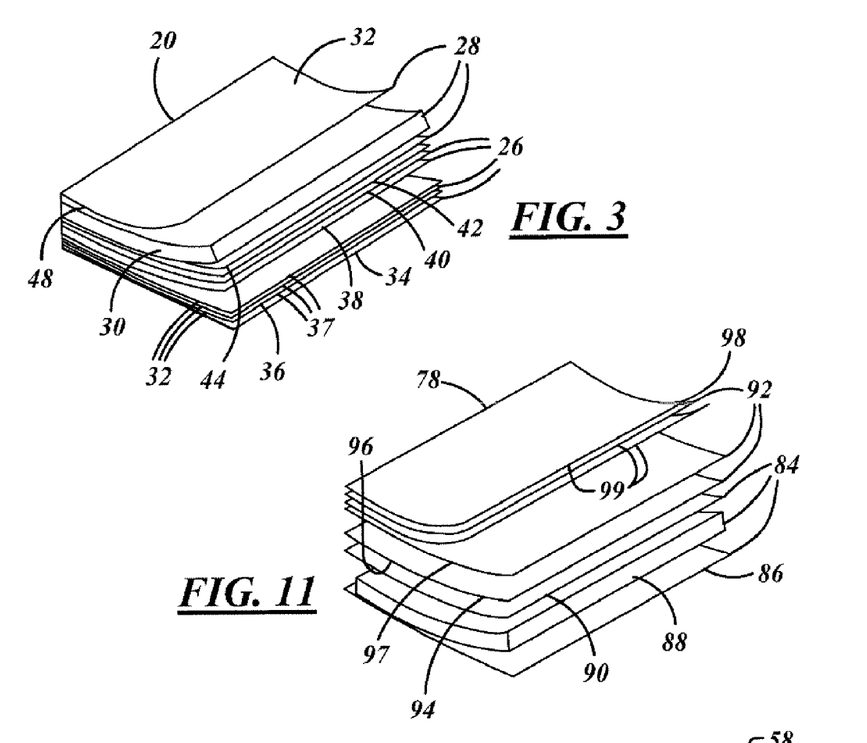
FIG. 3 is a perspective diagrammatic view of a sample assembled stack for a protective cover charge in accordance with an embodiment of the present invention.
FIG. 11 is a sample perspective diagrammatic view of an assembled stack for a splash in accordance with another embodiment of the present invention.
Figure 4:
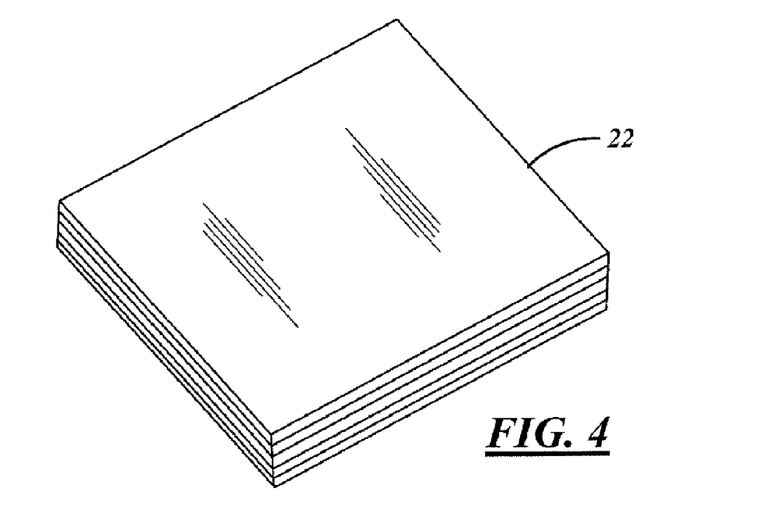
FIG. 4 is a perspective view of the charge of FIG. 3.
Figure 6:
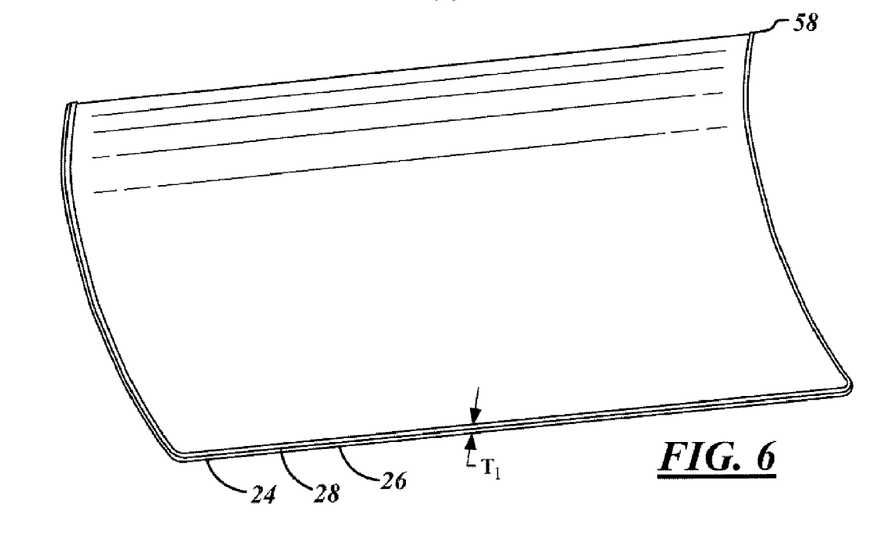
FIG. 6 is a perspective view of a protective cover multi-contoured laminate in accordance with an embodiment of the present invention.
Figure 8:
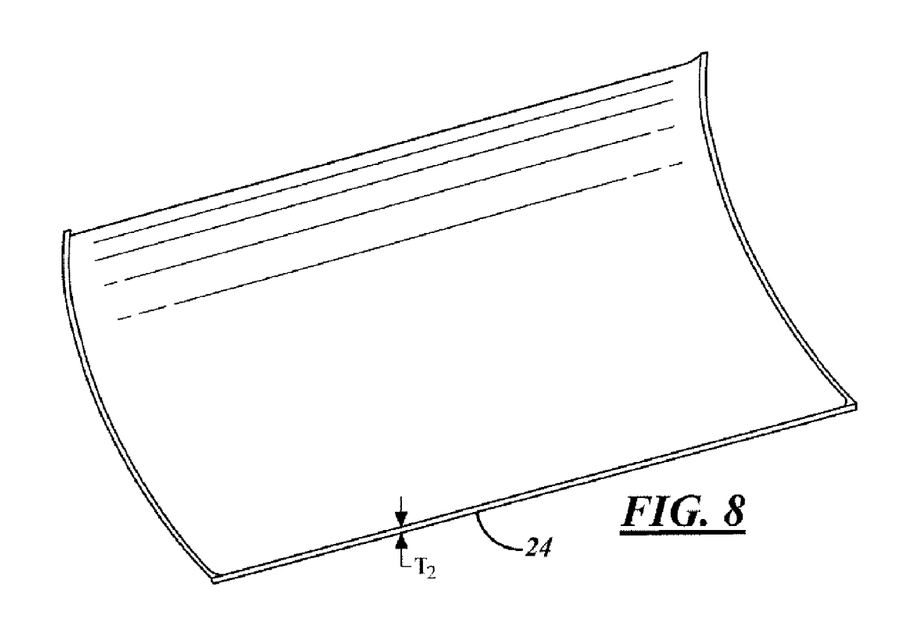
FIG. 8 is a perspective view of a protective cover in accordance with an embodiment of the present invention.
Figure 9:
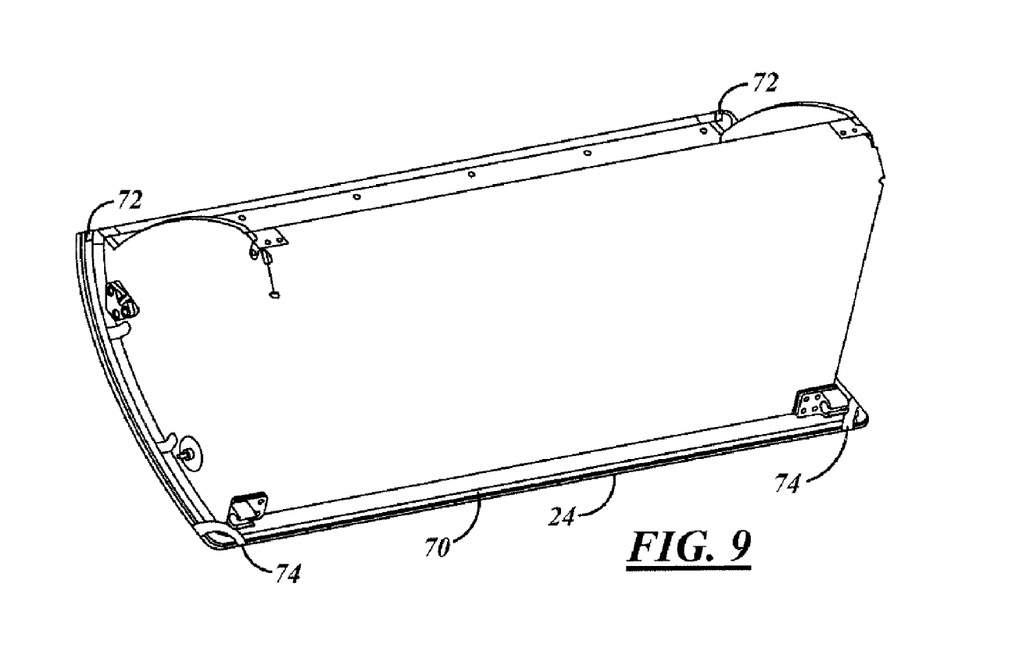
FIG. 9 is a perspective view of the protective cover coupled to a component in accordance with an embodiment of the present invention.

Referring now also to FIGS. 3 and 4, a perspective diagrammatic view of a sample assembled stack 20 for a charge 22 that is associated with a protective cover 24 is shown in accordance with an embodiment of the present invention. The charge 22 is shown in FIG. 4 and the protective cover 24 is shown in FIGS. 6, 8, and 9.

In step 100, material layer parameters are determined for the charge 22. The quantity of layers and plies within each layer is determined. In addition, layer materials, layer thicknesses, and stacking order of each layer is determined. The layer parameters are determined such that the overall thickness $T_1$ of the charge 22, subsequent to forming and curing thereof, is approximately equal to the overall finished thickness of the associated component. For example, when an overall stowage bin panel thickness is 0.375 inches the thickness $T_1$ is also approximately 0.375 inches. As is described in further detail below the material layers include protective cover layers and component emulating layers, represented by layers having numerical designators 26 and 28, respectively. The component emulating layers 28 include one or more part structural layers 30 (only one is shown). The number of material layers utilized and the thickness of each ply within each material layer establishes the thicknesses of the part structural layers 30. The more material layers and the thicker the plies of each material layer the thinner the part structural layers 30 and vice versa.

The thicknesses of the protective cover layers 26 are selected such that the overall protective cover thickness $T_2$ is less than or equal to a predetermined maximum thickness. The protective cover thickness $T_2$ can be seen in FIG. 8. This maximum thickness is set such that the protective cover mates properly with the associated component, such as the bin panels 14.

The material layers also include contour holding layers, represented by layers having numerical designator 32. The thickness and the number of plies of the contour holding layers, that are used to form the protective cover 24, are selected depending upon a desired stiffness rating of the protective cover 24. The material layers are described in further detail below.

In step 102, multiple material layers are assembled or stacked for a charge of a protective cover, such as the charge 22 and the protective cover 24. In step 102A, the protective cover layers are stacked. In step 102A1, a first protective laminate layer, as represented by the layer having numerical designator 34, is placed on a stacking platform (not shown), such as a table. The first laminate layer 34 may contain one or more plies of laminate material. A couple sample protective laminate materials that may be utilized to form a laminate are a woven fiberglass mat and a polyvinyl fluoride film, such as Tedlar®. The first laminate layer 34 may be formed of other materials, such as carbon and Kevlar®.

In step 102A2, a first contour holding layer, represented by the layer having numerical designator 36, is stacked onto the first laminate layer 34. The contour holding layer 36 is shown as having multiple plies 37. The contour holding layer 36 may be formed of fiberglass plies having resin, such as pre-preg –181 (1581) or pre-preg –120, or the like. The –181 and –120 designations refer to the thickness, bending characteristics, and strength of the material, as known in the industry. In one embodiment of the present invention the contour holding layer 36 includes two or three fiberglass plies. When heated, which occurs in step 106 below, the epoxy resin of the contour holding layer 36 flows and as it is heated or cured the resin locks itself and adjacent layers into a matrix that holds the contours in which the layers were pressed.

In step 102A3, a second protective laminate layer, represented by the layer having numerical designator 38, is stacked onto the contour holding layer 36. The second laminate layer 38 may also have one or more plies of protective laminate material and may be formed of similar materials as that of the first laminate layer 34. In step 102A4, a padding layer, represented by the layer having numerical designator 40, may be stacked onto the second laminate layer. The padding layer 40 may be formed of rubber material, such as neoprene, or other suitable padding material known in the art.

In step 102B, a separation layer, represented by the layer having numerical designator 42, may be stacked onto the protective cover layers and/or the padding layer. The separation layer 42 may be formed of a waffle weave type material, such as an interlaced fabric. A waffle weave or airweave type material may, as a few examples, be formed of cotton, nylon, polypropylene, or polyester. The separation layer 42, although not necessary, can be used to aid in separating the protective cover layers 26 from the component-emulating layers 28 subsequent to forming of the charge 22. The separation layer 42 can provide texture to the protective cover 24. The texture is created by leaving a print in the protective cover 24, subsequent to forming of the charge 22, that matches the pattern of the waffle weave. Of course, other separation materials may be used to form the composition of the separation layer 42.

In step 102C, filler layers or component-emulating layers 28 are stacked onto the protective cover layers 26 and/or the separation layer 42. In step 102C1, a third protective laminate layer, represented by the layer having numerical designator 44, is stacked onto the protective cover layers 26 and/or the separation layer 42. The third laminate layer 44 is similar to the first laminate layer 34 and the second laminate layer 38. The second protective laminate layer 38 and the third protective laminate layer 44 prevent the resin of the contour holding layers, such as layers 36 and 48, from flowing and preventing the separation of the protective cover layers 26 from the component-emulating layers 28.

In step 102C2, a part structural layer 30, is stacked onto the third laminate layer 44. The part structural layer 30 may be in the form of or include a honeycomb core or panel having the same (both of which not shown). The part structural layer 30 may include a honeycomb core like that used to form a stowage bin panel. The part structural layer 46 may have hexagonally shaped cells (not shown) and be formed of a paper, fiber, epoxy, resin, phenolic resin, Nomex®, or of other similar materials. The honeycomb core may be formed of polyester or polypropylene. Example honeycomb core thicknesses are within the range of approximately 0.1-1.5 inches, of course, other thicknesses may be utilized.

In step 102C3, a second contour holding layer, represented by the layer having numerical designator 48, is stacked onto the honeycomb layer. The second holding layer 48 is similar to the first holding layer 36.

The protective laminate layers 34, 38, and 44 have larger surface area than the part structural layer 30 and the contour holding layers 36 and 48 such that the contour holding layers 36 and 48 do not spread between material layers during forming of the charge 22.

In step 104, the protective cover layers 26, the component-emulating layers 28, and the separation layer 40 are aligned and held or coupled together to create the charge 22 using techniques similar to that when forming the stowage bin panel or the related vehicle component. For example, the material layers may be stapled to each other such that their relative orientations and positions are maintained prior to forming.

In step 106, the charge 22 is formed (or shaped) and cured to create a multi-contoured laminate. The charge 22 is placed within a primary or original mold die, such as the sample mold die 50 shown in FIG. 5. The mold die 50 has a top half 52 and a bottom half 54. The mold die 50 is generally used during component production to form the component of concern, or in relation to the example embodiment described, the bin panels 14. The mold die 50 is utilized out of production to conform the charge 22 to the contours of the mold die 50 with heat and applied pressure. Oil, at a high temperature, or steam is passed through lines 56 in the mold die 50, which causes the above-stated layers to conform to the mold when pressure is applied. The conformed layers are referred to as a multi-contoured laminate, which is shown in FIG. 6 and designated as 58. As an example, the charge may be formed within an approximate temperature range of 200-300° F. or 93-149° C. for approximately ten minutes. In one embodiment, an approximate forming temperature of 280° F. is used. The temperature and the formation time vary depending upon the application. The mold die 50 may also be placed within a press to apply formation pressure. As an example, 900-1500 ton presses may be used.

In step 108, the multi-contoured laminate 58 is removed from the mold die 50. The multi-contoured laminate 58 may be placed into a cooling fixture (not shown) to control the shape of the laminate during cooling. The cooling fixture may have features to assist in statistical process control processes or analysis. The multi-contoured laminate 58 includes the protective cover layers 26 and the component-emulating layers 28.

In step 110, the protective cover layers are separated from the multi-contoured laminate and are in the form of a thin hard shell, referred to as a protective cover. Thus, the protective cover layers 26 are separated from the laminate 58 to provide the protective cover 24. The protective cover layers 26 may be peeled, or pried away from the component-emulating layers 28 and the separation layer 42 or removed via some other technique known in the art. The component-emulating layers 28 and the separation layer 42 are then discarded.

Figure 7:
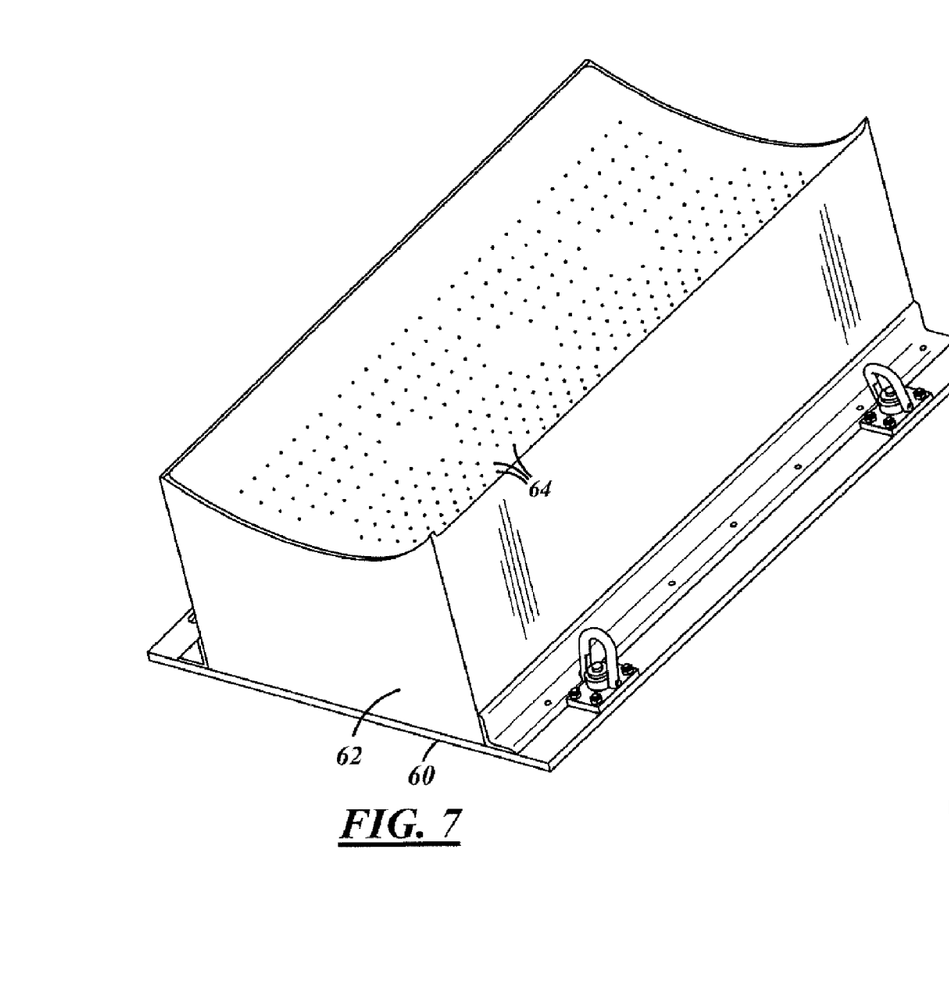
FIG. 7 is a perspective view of a routing fixture.

Referring now to FIG. 7, a perspective view of a sample vacuum table 60 is shown. In step 112, the protective cover 24 is routed as desired. The routing fixture (not shown), which may be used to route the component of concern, may also be used to route the protective cover layers 26. The routing fixture is hollow and is set onto the table 60, which includes a main body 62 that has multiple vacuum holes 64. A vacuum pressure is generated within the holes 64 such that the protective cover layers 26 are held down to the routing fixture. Prior to activation of the vacuum and routing of the protective cover layers 26 a routing fixture lid (not shown) is placed over and attached to the routing fixture. The lid performs as a wear surface to protect the routing fixture. The protective cover layers 26 may be routed using a numerically controlled machine, as are known in the art. The outer edges of the protective cover layers 26 may be removed by the routing process. Also, slots, holes, or other various shaped cutouts may be removed from the protective cover layers 26. FIG. 8 provides a sample illustration of the stowage bin protective cover 24 subsequent to the routing thereof.

In steps 114, a padding layer, similar to the padding layer 40, may be attached to the protective cover 24. The padding layers reside between the protective cover 24 and the component to be protected. The thickness of the padding layer may be accounted for in step 100 in determining thickness of the part structural layer 30. In one embodiment, hook and loop strips, such as Velcro®, are used as padding and to couple the protective cover 34 to the associated component. The padding layer may cover the edges of the protective cover 24.

In step 116, component-coupling mechanisms are attached to the protective cover 24. The coupling mechanisms may include hook and loop strips, such as Velcro® loop strips, straps, bungee loops, clips, hooks, magnets, adhesive strips, or other coupling mechanisms known in the art. The component-coupling mechanisms may be attached to the protective cover 24 using techniques known in the art. FIG. 9 provides a sample illustration of a stowage bin panel 70 with the protective cover 24 attached thereon. The protective cover 24 is held onto the bin panel 70 via component-coupling mechanisms, which include a pair of hooks 72 and a pair of straps 74.

Figure 10:
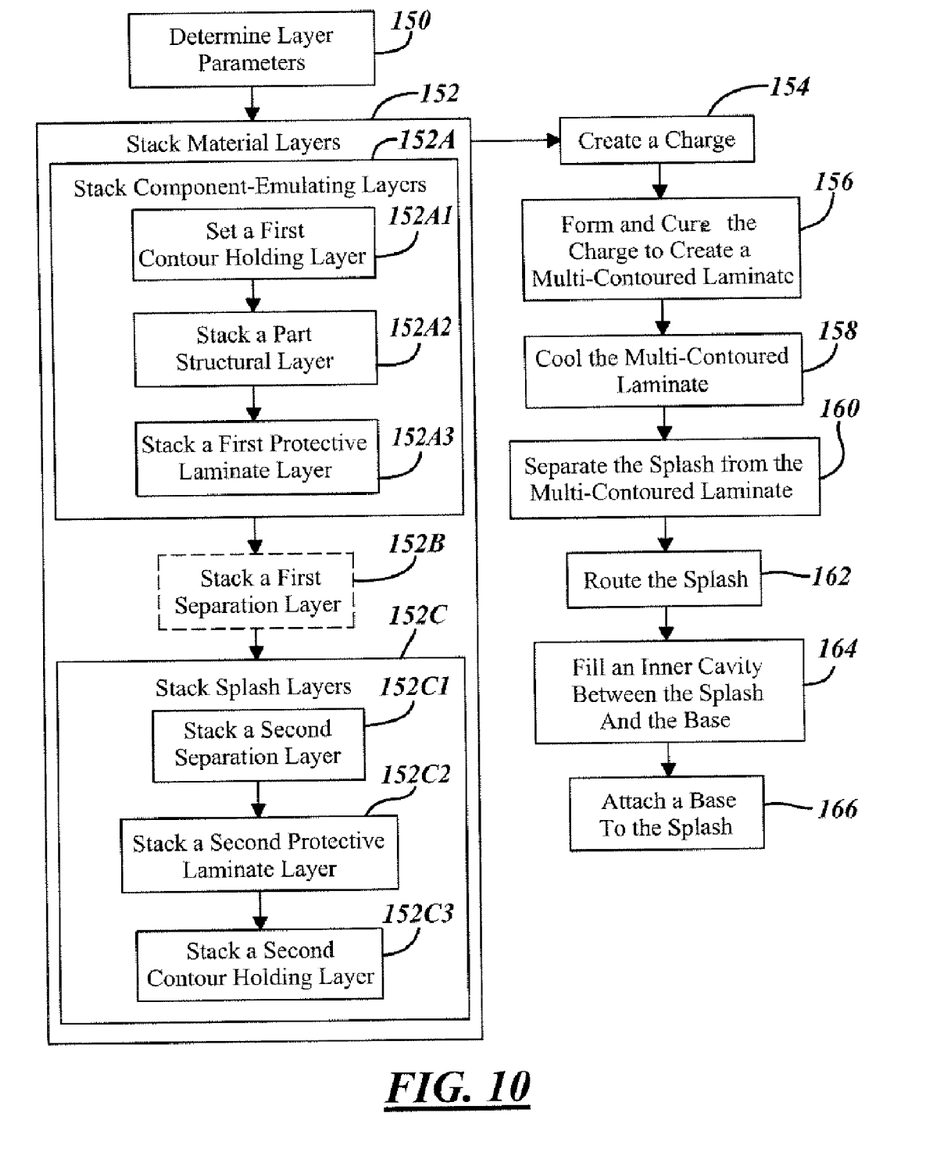
FIG. 10 is a logic flow diagram illustrating a method of forming a down stream part mold for a vehicle component in accordance with an embodiment of the present invention.

Referring now to FIG. 10, a logic flow diagram illustrating a method of forming a down stream part and/or a down stream part structure or mold for a vehicle component in accordance with an embodiment of the present invention is shown.

Figures 12, 13:
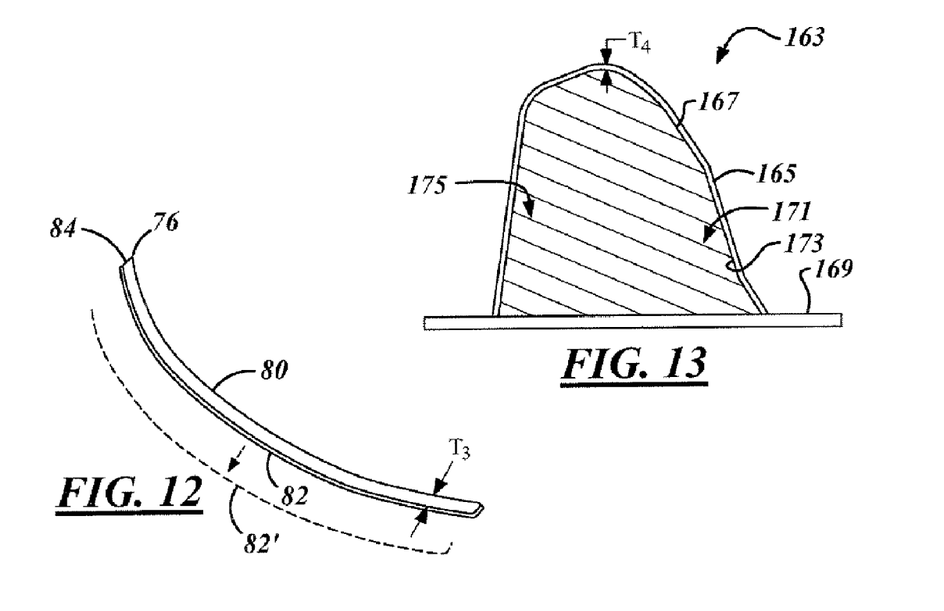
FIG. 12 is a side view of a splash multi-contoured laminate and of an outer mold line separated therefrom in accordance with an embodiment of the present invention.
FIG. 13 is a side view of a down stream part structure or mold forming setup in accordance with still another embodiment of the present invention.

In step 150, layer parameters are selected similarly as they are selected in step 100 above. The layers for one or more splashes may be determined, as well as the layers associated with and emulating a component. One or more splashes may be formed from a single charge. The layer parameters are also selected such that the overall thickness $T_3$ of the corresponding charge subsequent to curing, or multi-contoured laminate 76, is also approximately equal to the overall thickness of the associated component, as shown in FIG. 12.

Referring now also to FIG. 11, a perspective view of a sample stack 78 for a splash charge is shown. In step 150, it is also determined whether an inner mold line, an outer mold line, some intermediate line therebetween, or some combination thereof are to be separated and utilized from a produced multi-contoured laminate. An inner mold line and an outer mold line each refer to a particular set of multi-contoured laminate layers that may be used as a splash and to form female or male secondary molds. A sample inner mold line 80 and a sample outer mold line 82 are shown in FIG. 12. An inner mold line and an outer mold line may be used for purposes other than to create molds. For example, an inner mold line may be used as a routing fixture vacuum cover instead of using a lid, as stated above. When an inner mold line is utilized as a routing fixture cover, spacers (not shown) may be placed between the outer mold line and the inner mold line. The spacers and mold lines provide a hollow chamber with air channels. This provides a light fixture with a small vacuum chamber and a single vacuum draw location. The spacers may be of various types and styles known in the art. The spacers may be formed of foam, plastic, rubber, or other spacer materials known in the art.

In step 152, the multiple layers selected in step 150 are assembled and stacked. For simplicity, the following steps are primarily described with respect to the assembling, forming, separation, and utilization of a single splash corresponding to an outer mold line. Stacking order of layers associated with an inner mold line may be reversed as compared with an inner mold line.

In step 152A, component-emulating layers, represented by the layer having numerical designator 84, are stacked. In step 152A1, a first contour holding layer, represented by the layer having numerical designator 86, is placed on a stacking platform. The first contour holding layer 86 is similar to the contour holding layers 36 and 48. In step 152A2, a part structural layer, represented by the layer having numerical designator 88, is stacked onto the contour holding layer 86. The part structural layer 88 is similar to the part structural layer 30. In step 152A3, a first protective laminate layer, represented by the layer having numerical designator 90, is stacked onto the part structural layer 88. The first laminate layer 90 is similar to the laminate layers 34, 38, and 44. Step 152A may be repeated, performed subsequent to step 152C, and performed in reverse order to form an inner mold line.

In step 152B, a first separation layer (not shown), similar to the separation layer 42, may be stacked onto the component-emulating layers 84. Of course, when both an outer mold line and an inner mold line are utilized two separation layers may be used.

In step 152C, splash layers 92 are stacked onto the separation layer and/or the component-emulating layers 84. In step 152C1, a second separation layer, represented by the layer having numerical designator 94, is stacked onto the first separation layer and/or the component-emulating layers 84. The second separation layer 94 may have a non-stick surface or side 96, which allows for the formation of parts thereon and the easy removal of such parts therefrom. As an example, the second separation layer 94 may be formed of Teflon tape. The non-stick side 96 is in contact with the first separation layer or the first laminate layer 90.

In step 152C2, a second protective laminate layer, represented by the layer having numerical designator 97, is stacked onto the second separation layer 94 and is similar to the laminate layers 34, 38, 44, and 90. Note the second separation layer 94 may be applied or attached to the second laminate layer 97 prior to the stacking thereof onto the first separation layer and/or the component-emulating layers 84.

In step 152C3, a second contour holding layer, represented by the layer having numerical designator 98, is stacked onto the second laminate layer 97. The contour holding layer 98 may have any number of plies 99, similar to the contour holding layer 36. In one embodiment of the present invention, the contour holding layer 98 includes two-three plies.

Figure 5:
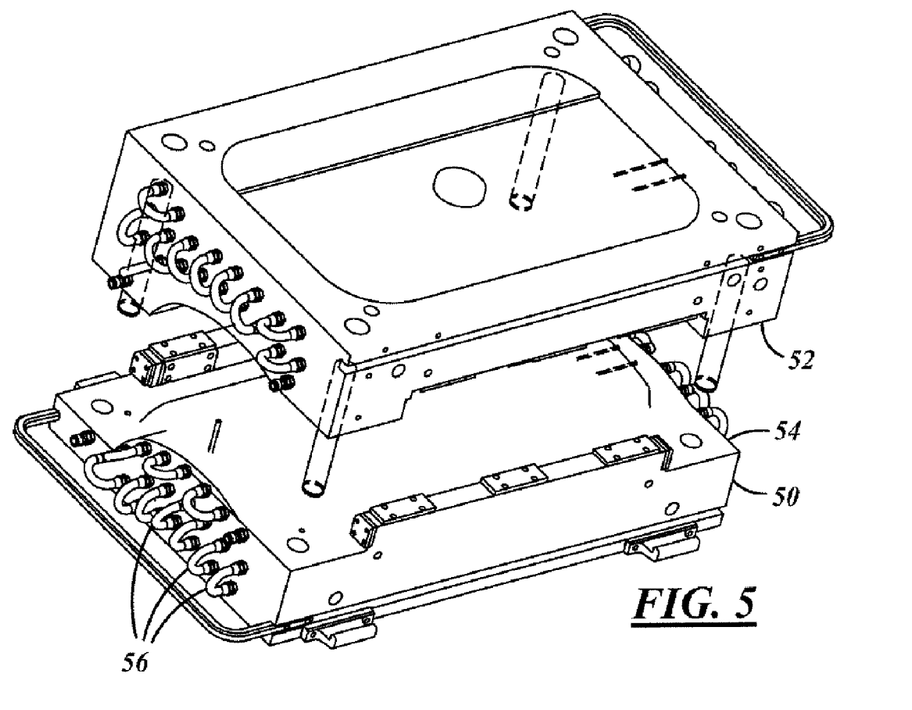
FIG. 5 is a perspective view of a vehicle component mold die.

In step 154, the stack 78 is coupled together, as performed in step 104, to form a splash charge. In step 156, the charge is placed within a mold die, such as the mold die 50, and is formed and cured to create a multi-contoured laminate. In step 158, the multi-contoured laminate is cooled, as performed in step 108.

Referring now to FIG. 12, a side view of the multi-contoured laminate 76 is shown with the outer mold line 82 separated therefrom, as represented by dashed line 82'. The separated outer mold line is a splash. In step 160, the outer mold line may be separated from the multi-contoured laminate to provide the splash. The outer mold line 82 represents the second separation layer 94, the second laminate layer 97, and the second contour holding layer 98 subsequent to forming. The inner mold line 80 is also shown as an illustrative example. The inner mold line 80 is shown as being unseparated from the component emulating layers 84. The outer mold line 82 may be separated from the multi-contoured laminate 76 using techniques stated in step 110 above. In step 162, the produced splash may be routed, as described in step 112 above.

Referring now to FIG. 13 a side view of a down stream part structure or mold forming setup 163 in accordance with still another embodiment of the present invention is shown. A second sample splash 165 is shown. The produced splash 165 may be used to form a down stream part structure or mold 167, which may be used to form down stream parts.

Figure 15:
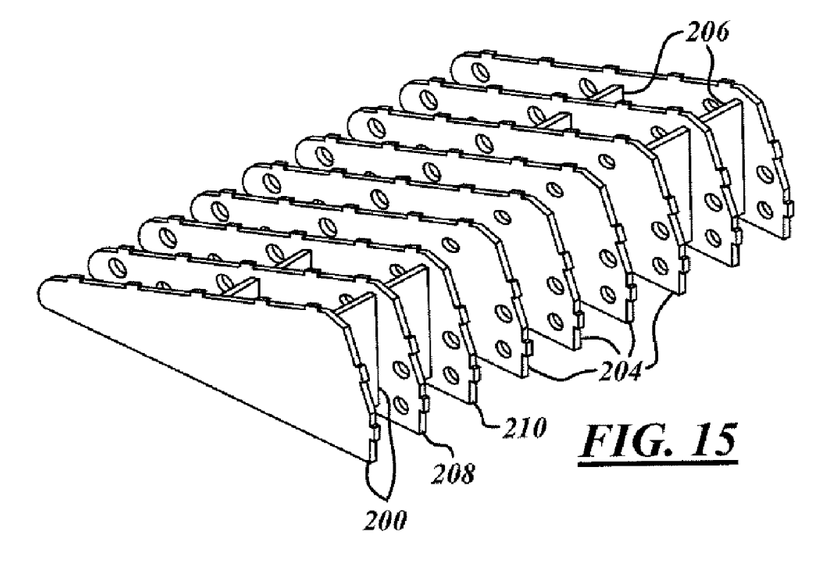
FIG. 15 is a perspective view of single direction headers in accordance with an embodiment of the present invention.
Figure 16:
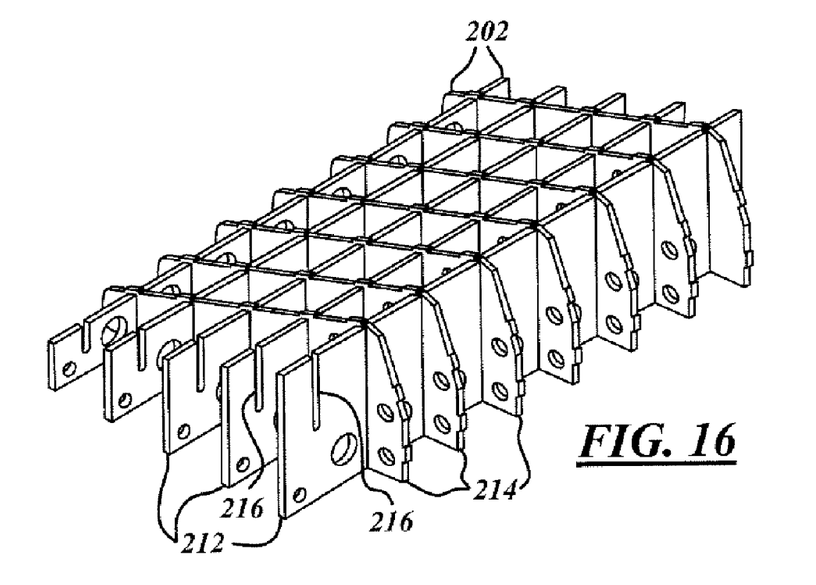
FIG. 16 is a perspective view of crisscross egg crate headers in accordance with another embodiment of the present invention.

In step 164, an inner cavity 171 between the splash 165 and the base 169 is filled to form the secondary mold 167. The inner cavity 171 may be filled with expandable foam, honeycomb elements, foam headers, crush-core panels, flat panels, or other suitable materials known in the art. A production part may be used as a backing to the splash during filling of the inner cavity to maintain shape of the splash. When panels are utilized to fill the inner cavity 171 they may be pre-cut to have outer dimensions that match the inner contours of the splash 165. The matched contours allow the panels when inserted and/or stacked with the splash 165 to conform to the inner surface 173. The panels may be adhered to each other using known adhesives and placed in an "egg crate" pattern. Single direction headers and crisscross egg crate headers are shown in FIGS. 15 and 16 below. The inner cavity 171 may be filled from the open ends or sides 175, designated by arrow 175, of the down stream part structure or mold forming setup. When the sides 175 are not open, the base 169 may have injection holes or removable members (not shown) to allow for the injection or insertion of various filler materials, some of which are stated above. As a couple of examples, the down stream part structure or mold 167 may be used as a routing fixture or as a vacuum-forming mold.

In step 164, a base 169 may be attached to the splash 165. The base 169 may be adhered to the splash 165 or held on by some other technique known in the art. The base 169 may be in the form of a honeycomb panel, a flat panel, a crush-core panel, or other rigid panel known in the art. The base may not be utilized, for example, when a flex-base vacuum form mold is used, see below.

Figure 14:
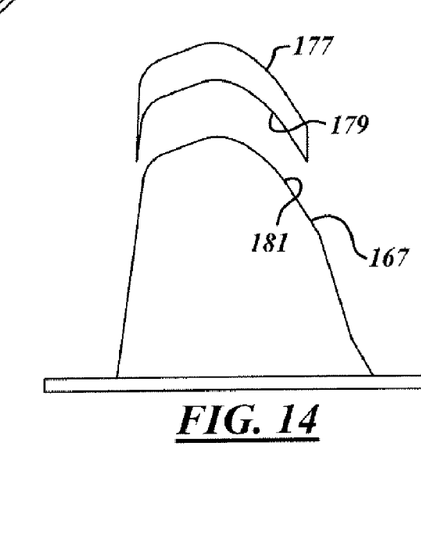
FIG. 14 is a side view of a vehicle component prior to placement on the down stream part mold of FIG. 13.

Referring now to FIG. 14, a side view of a vehicle component 177 prior to placement on the secondary mold 167. Note the inner contour 179 of the component 177 matches the outer contour 181 of the secondary mold 167. The component 177 may be placed onto the secondary mold 167 prior to the application of a final outer protective and decorative laminate (not shown), such as that applied to a stowage bin panel. When the thickness $T_4$ of the splash 165 is maintained to be less than a determined thickness the inner contour 179 closely matches the outer contour 181, which allows the splash 165 to nest easily onto the secondary mold 167 and to be fully supported for a vacuum-forming process.

The down stream part structures or molds as described above are inexpensive to produce and thus are disposable. The down stream structures or molds may be disposed or stored depending upon the expense associated storing of the molds.

Following the formation of a vacuum form mold, as described above, a flex-base vacuum-forming mold or stand may be used in conjunction with the vacuum form mold to form a protective cover over a production part. The vacuum form mold including the splash and the associated filled inner cavity along with the production part and a protective cover material may be placed within a flex-base stand. The flex-base stand includes a pair of flexible blankets, which may be formed of silicone. The vacuum form mold is placed between the blankets. The production part is placed onto the vacuum form mold. The protective cover material, such as Tedlar®, is applied or placed onto the production part. The blankets are brought together or sealed and a vacuum is applied to the area between the blankets. The vacuum causes the protective cover material to form over and onto the production part. Of course, the vacuum-forming mold may be used in and of itself when a base is attached, as described in step 166 above, to form the protective cover.

The above-described steps in the methods of FIGS. 2 and 10 are meant to be illustrative examples; the steps may be performed sequentially, synchronously, simultaneously, or in a different order depending upon the application.

Referring now to FIGS. 15 and 16, perspective views of single direction headers 200 and crisscross egg crate headers 202 are shown. The single direction headers 200 include extended headers 204 and spacer headers 206. The spacer headers 206 reside between and couple adjacent extended headers, such as extended headers 208 and 210. The eggcrate headers 202 include a first series of headers 212 and a second series of headers 214. The first series 212 are perpendicular to and inner-couple the second series 214. The first series 212 includes a upper vertical slots 216 and the second series 214 includes lower vertical slots (not shown), which allow for the insertion of the first series 212 and the second series 214 into each other, as shown.

The present invention provides cost effective and efficient techniques for the production of component protective covers, splashes, secondary molds, and down stream parts. The produced component protective covers, splashes, secondary molds, and down stream parts since formed directly or indirectly from the mold die of a component have contours that closely match that of the corresponding component.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of manufacturing a protective cover for a component of a vehicle comprising:

assembling a plurality of layers to form a charge within a mold of the component and to form a multi-contoured laminate comprising stacking at least one protective cover layer by stacking at least one contour holding layer;

stacking at least one component emulating layer by stacking at least one protective laminate layer, at least one part structural layer, and at least one contour holding layer;

stacking at least one separation layer between said protective cover layer and said component emulating layer;

curing the charge to create the multi-contoured laminate;

separating the protective cover layer from said multi-contoured laminate by removing the component emulating layer from said protective cover layer to provide the protective cover, wherein said protective cover maintains the shape of the multi-contoured laminate and has a thickness considerably less than the multi-contoured laminate.

2. A method as in claim 1 wherein assembling a plurality of layers comprises:
   stacking a first protective laminate layer; and
   stacking a second protective laminate layer on said first protective laminate layer for post-forming separation therebetween.

3. A method as in claim 1 wherein separating the protective cover from said multi-contoured laminate, comprises removing component-emulating layers from protective cover layers of said multi-contoured laminate.

4. A method as in claim 1 wherein assembling a plurality of layers comprises stacking a plurality of layers comprising materials selected from a group consisting of fiberglass, polyvinyl fluoride film, polyvinyl fluoride, honeycomb, waffle weave, rubber, neoprene, and poly-(p-phenylene terephthalamide).

5. A method as in claim 1 further comprising coupling attachment straps to the protective cover.

6. A method of forming a down stream part structure or mold for a component comprising:
   assembling a plurality of layers to form a charge, said charge being associated with a splash;
   forming said charge within an original mold of the component to produce a multi-contoured laminate by stacking a plurality of component-emulating layers formed by stacking at least one contour holding layer, stacking at least one part structural layer; and stacking at least one protective laminate layer; and
   stacking a plurality of splash layers by stacking at least one protective laminate layer; and stacking at least one contour holding layer;
   separating the splash from said multi-contoured laminate; wherein
      said splash maintains the shape of said multi-contoured laminate after being separated from said multi-contoured laminate.

7. A method as in claim 6 further comprising stacking a separation layer having a non-stick surface.

8. A method as in claim 6 wherein separating said multi-contoured laminate comprising:
   selecting at least one mold line comprising said plurality of splash layers; and
   removing said plurality of component-emulating layers from said at least one mold line.

9. A method as in claim 8 wherein selecting at least one mold line comprises selecting at least one of an inner mold and an outer mold line.

10. A method of forming a down stream part structure or mold for a component comprising:
    assembling a plurality of layers to form a charge within an original mold of the component to produce a multi-contoured laminate, said charge being associated with a splash, by stacking a plurality of component-emulating layers formed by stacking at least one contour holding layer, stacking at least one part structural layer; and stacking at least one protective laminate layer; and
    stacking a plurality of splash layers by stacking at least one protective laminate layer; and stacking at least one contour holding layer;
    separating the splash from said multi-contoured laminate; wherein said splash maintains the shape of said multi-contoured laminate after being separated from said multi-contoured laminate and has a thickness considerably less than that of said multi-contoured laminate.

11. A method as in claim 10 further comprising filling said splash with a down stream part structure or mold material to form a vacuum form mold.

12. A method as in claim 11 wherein said splash is filled with expandable foam.

13. A method as in claim 11 wherein said splash is filled with at least one honeycomb element.

* * * * *